(12) United States Patent
Lord

(10) Patent No.: US 11,936,330 B2
(45) Date of Patent: Mar. 19, 2024

(54) SYSTEM AND METHOD FOR FASTENING PROTECTIVE BARRIERS ADAPTED TO BE COMPATIBLE WITH SOLAR PANEL SYSTEMS

(71) Applicant: Kyle Lord, Carbondale, CO (US)

(72) Inventor: Kyle Lord, Carbondale, CO (US)

( * ) Notice: Subject to any disclaimer, the term of this patent is extended or adjusted under 35 U.S.C. 154(b) by 24 days.

(21) Appl. No.: 17/233,511

(22) Filed: Apr. 18, 2021

(65) Prior Publication Data
US 2022/0294383 A1 Sep. 15, 2022

Related U.S. Application Data

(60) Provisional application No. 63/159,495, filed on Mar. 11, 2021.

(51) Int. Cl.
*F24S 25/634* (2018.01)
*F16B 2/20* (2006.01)
(Continued)

(52) U.S. Cl.
CPC .............. *H02S 20/23* (2014.12); *F16B 2/20* (2013.01); *F16B 2/241* (2013.01); *F24S 25/634* (2018.05);
(Continued)

(58) Field of Classification Search
CPC .. F16B 2/248; F16B 2/24; F16B 2/241; E04H 17/16; E04H 17/161; E04H 17/163;
(Continued)

(56) References Cited

U.S. PATENT DOCUMENTS

| | | | |
|---|---|---|---|
| 4,280,254 A | * | 7/1981 | Racke ..................... A41F 9/007 24/336 |
| 5,451,167 A | * | 9/1995 | Zielinski ................ H01R 4/646 439/435 |

(Continued)

FOREIGN PATENT DOCUMENTS

| | | | | |
|---|---|---|---|---|
| WO | WO 2012/169565 | * | 12/2012 | ...... F24S 2025/6004 |
| WO | WO-2020021178 A1 | * | 1/2020 | .............. F16B 2/243 |
| WO | WO-2020164649 A1 | * | 8/2020 | .......... A44B 11/2592 |

OTHER PUBLICATIONS

Omniclip Rooftop Sysytems, Omni clip, website, US, https://www.omniclips.com/pricing, accessed Apr. 7, 2021.
(Continued)

*Primary Examiner* — Michael P Ferguson
(74) *Attorney, Agent, or Firm* — Lisa Foundation Patent Law Clinic

(57) ABSTRACT

A system and method for fastening protective barriers to solar panel systems includes a fastener system including a main clip that is coupled to a support clip and a wireform splice. The main clip and support clip of the fastener system are adapted to engage with a solar panel frame. Once engaged with the panel frame, a barrier, such as wire mesh, is placed adjacent to a front face of the main clip and the wireform splice may be coupled to the main clip and engaged with the barrier. The splice is used to secure the barrier to the faceplate. In one embodiment, the fastening devices may be placed in a spaced arrangement, and the barrier is coupled to each fastening device along the continuous run. In this way, a single section of barrier may be secured to the solar panel array system.

6 Claims, 11 Drawing Sheets

(51) Int. Cl.
*F16B 2/24* (2006.01)
*H02S 20/23* (2014.01)
*H02S 30/10* (2014.01)
*F24S 25/60* (2018.01)

(52) U.S. Cl.
CPC ....... *H02S 30/10* (2014.12); *F24S 2025/6004* (2018.05)

(58) Field of Classification Search
CPC ........ H02S 20/23; H02S 30/10; F24S 25/634; F24S 2025/6004; F24S 40/10
See application file for complete search history.

(56) References Cited

U.S. PATENT DOCUMENTS

| | | | |
|---|---|---|---|
| 7,608,786 B2 | 10/2009 | Deciry et al. | |
| 9,291,369 B2* | 3/2016 | West | F24S 25/61 |
| 9,746,013 B2* | 8/2017 | Talley | F16M 13/02 |
| 10,530,293 B2* | 1/2020 | Legall | F24S 25/634 |
| 11,552,590 B2* | 1/2023 | Cavieres Pinilla | H02S 40/30 |
| 2010/0229916 A1 | 9/2010 | Bechamp | |
| 2011/0113683 A1 | 5/2011 | Morgan | |
| 2012/0201601 A1* | 8/2012 | Rizzo | F24S 25/632 403/409.1 |
| 2014/0158184 A1* | 6/2014 | West | H02S 20/23 136/251 |
| 2016/0265566 A1* | 9/2016 | Talley | F16B 2/241 |
| 2016/0268959 A1* | 9/2016 | Meine | F24S 25/61 |
| 2017/0302219 A1* | 10/2017 | Rothschild | F24S 25/11 |
| 2018/0062568 A1* | 3/2018 | Schulte | F24S 25/65 |
| 2019/0219083 A1* | 7/2019 | Selle | F16B 12/20 |
| 2019/0222169 A1* | 7/2019 | Yang | F24S 25/634 |
| 2019/0309813 A1* | 10/2019 | Isshiki | F16D 65/02 |
| 2020/0256319 A1* | 8/2020 | Clifton | H02S 30/10 |

OTHER PUBLICATIONS

Bird Barrier, bird barrier, website for sale, US, https://birdbarrier.com/solar-panel-protection-clips-100-pack.html accessed Apr. 7, 2021.

* cited by examiner

Figure 6 - Version 2
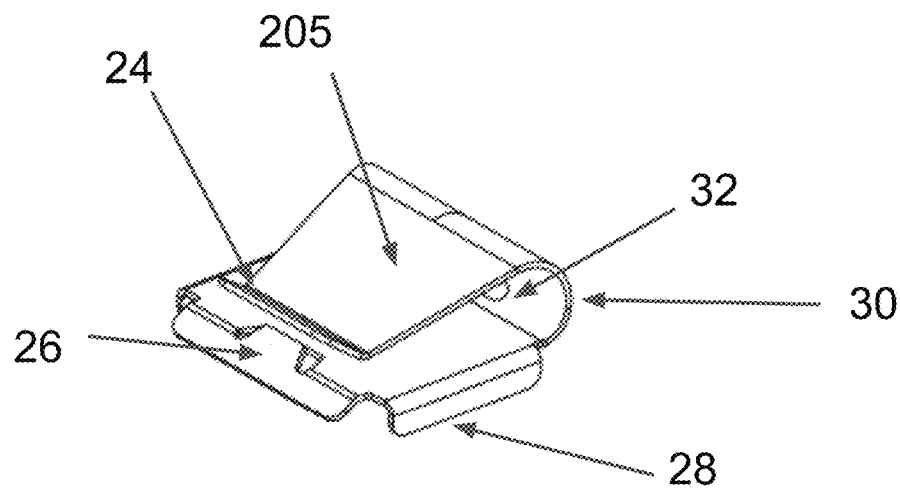
FIG 7
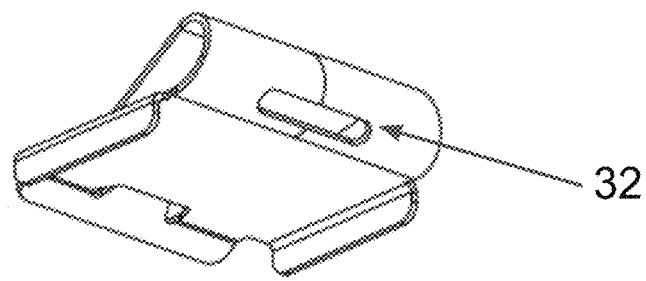
FIG 8
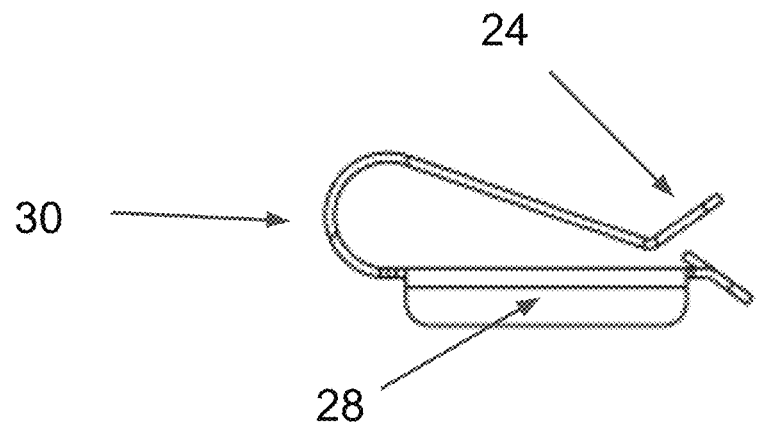

Figure 16 - Wire Splice Connecting Two Pieces of Mesh
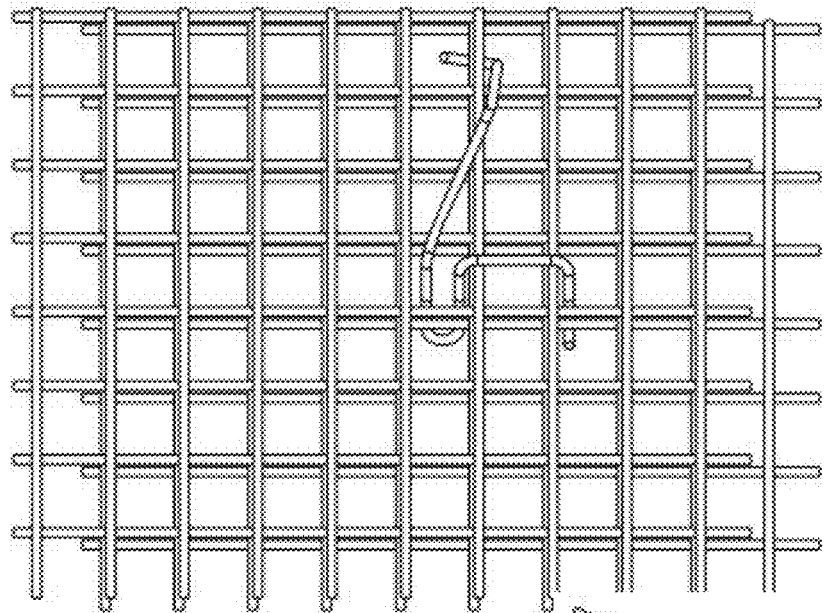
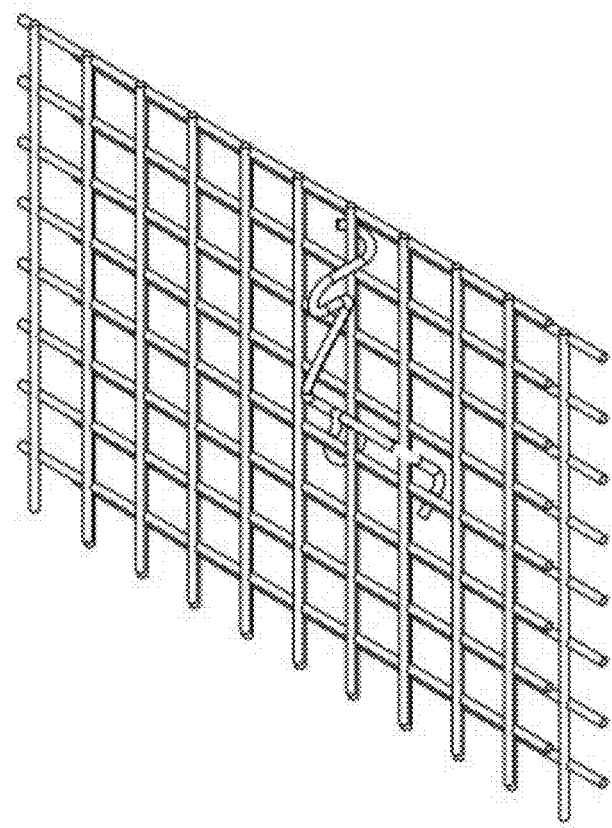

SYSTEM AND METHOD FOR FASTENING PROTECTIVE BARRIERS ADAPTED TO BE COMPATIBLE WITH SOLAR PANEL SYSTEMS

CROSS REFERENCE TO RELATED APPLICATIONS

This application claims the benefit of U.S. provisional patent application 63/159,495, filed Mar. 11, 2021 entitled "System and Method for Fastening Protective Barrier to Solar Panels", the entirety of the disclosure of which is hereby incorporated by reference.

STATEMENT REGARDING FEDERALLY SPONSORED RESEARCH

N/a

NAMES OF PARTIES TO A JOINT RESEARCH AGREEMENT

N/a

REFERENCE TO A SEQUENCE LISTING, TABLE, OR COMPUTER PROGRAM

N/a

BACKGROUND

1. Field of the Invention

The present generally relates to a fastening device and method for installing a protective barrier around a solar panel system.

2. Description of Related Art

Residential and commercial rooftop solar photovoltaic ("PV") systems are becoming more prevalent worldwide as an economic solution to decrease carbon emissions while saving money on the owner's electricity bill. A common method to attach solar panels to a roof is to mount the solar panels to an aluminum racking system, or solar panel frame, also referred to as "the panel frame" or "frame". The aluminum racking system is attached to the roof with compatible standoffs (raising the solar panels above the roof by approximately 2 to 10 inches). That is, the mounting method results in a gap between the bottom of the solar module and the roof surface. Rodents and birds have found their way under the gap between the solar panels and the roof surface, which creates a problem for the owner of the solar panels because the rodents, birds, and other nuisances may damage the PV systems or diminish the aesthetics. For example, pigeons nest under solar arrays in urban areas creating noise issues, a huge mess and potential damage to the roofing material and electrical systems. Rodents, such as squirrels, find their way under the array. These rodents and birds often chew or peck wires and create fire hazards for the buildings as well as decrease solar production. For example, damage to the wiring or other components of the PV system may result in a ground fault (i.e., chewed wires arc to ground), which eliminates the solar production entirely. This loss of production requires costly repairs. There are any number of problems that may be caused by birds, rodents, or other creatures and/or elements that find their way under this gap between the solar PV system and the roof. In response, the industry has identified the problem and made various attempts at providing a solution.

To protect against animal disturbance it has become best practice in the solar industry to install a perimeter barrier around the solar array. This perimeter barrier helps block the space between the panel and the roof, a gap which is approximately 2 to 10 inches. There are now several attempted solutions and methodologies to fill the gap between the solar module and roof. One commonly used method to avoid the issues described above is to install wire mesh around the perimeter of the solar panel. There are numerous problems and challenges with attempted solutions related to the securing of the mesh to the panels to enclose the array perimeter. The product must be fastened in multiple points around the array to withstand strong weather events, gravity, thermal expansion/contraction and disturbances from both humans and animals. Additionally, there are problems when trying to splice lengths of mesh together. Moreover, the panel frames on which solar PV systems are often installed come in a variety of shapes, configurations, and sizes, and thus connecting to the varying geometries of the panel frame itself creates a challenge. For these reasons and others that would be understood by a person skilled in the art, it has proven difficult to achieve a universal, durable, easy-to-install and aesthetically appealing fastening component to secure a barrier, such as mesh, around the gap between the PV system and the roof.

So as to reduce the complexity and length of the Detailed Specification, and to fully establish the state of the art in certain areas of technology, Applicant(s) herein expressly incorporate(s) by reference all of the following materials identified in each numbered paragraph below.

Install Mesh Directly to Solar Panel Frames: One method of securing the wire mesh to the perimeter of the solar panel is by drilling directly into the solar panel and the roof. Drilling into the panel is problematic as it voids the panel's warranty. Drilling into the roof is problematic because the installer risks creating leaks and allowing water damage to the roof and structure. This method is infrequently used by professionals.

Fasten Mesh to Solar Panel: Another method related to the installation of wire mesh is to fasten the mesh to the solar panel rather than drill to the panel directly. Conventional methods are deficient in that there is no clear and obvious method in which to prepare the mesh to be fastened. Installers may leave mesh only supported by the fastener which results in a final product with various weak points (ie, gaps above and below the mesh). Still other deficiencies are that the conventional fasteners may be weak (i.e., cannot support much weight, too malleable, and loosens over time) and may be single use only. When a panel array requires service, removal and/or replacement (e.g., in the case of a roof replacement, panel replacement, etc.), the installation company must procure and install all new fasteners.

Another attempted solution is comprised of a solar array edge screen clip. The clip attaches to the bottom of the solar array. The installer must manually break the bottom piece to fit the desired gap between the roof and solar array, which results in wasted material. The bottom part includes several tabs that latch onto the wire mesh from the inside which provides low support; the wire mesh is prone to movement from wind and weather events as it is only fastened from one side (inside) as opposed to both sides. As such, the mesh may be pushed under the array in the event of snow loading, high wind or animal force. Still another deficiency is the installation may be a cumbersome process.

Yet another attempted solution of fastening a perimeter barrier is utilizing an adhesive (peel and stick) method to attach the material to the panel frame. Again flaws exist in that the material itself is extremely rigid which prohibits flexibility when trying to retrofit onto complex array perimeters of varying geometric shapes and sizes. This adds significantly to installation time which results in a higher price. Additionally, the adhesive needs to be applied to a completely clean surface and within a specific temperature range (e.g., must be installed when temperatures are approximately between 55 and 70 degrees Fahrenheit, and humidity is approximately between 15-35%). An additional problem with this attempted solution is the product prevents airflow thereby increasing temperatures in the space under the solar panel. Rising temperature drops voltage which decreases the efficiency of the solar panel. This results in less solar production and undermines the customer's return on investment (i.e., the amount of money saved in electricity from installing solar panels).

U.S. Pat. No. 7,608,786 discloses a system and method involving a splice plate which is utilized to connect two cable tray mesh sections.

U.S. Pub. No. 2011/0113683 discloses a system and method involving supporting a sheet of material in order to provide support or protection from the elements. One embodiment described within the specification mentioned the systems use in conjunction with a solar panel to provide protection.

U.S. Pub. No. 2010/0229916 discloses a system and method involving a retractable resilient mesh barrier. The purpose of such barrier is to extend and provide protection to the panel or panels. The barrier may also be adapted to incorporate a heating element to melt ice from the system.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant(s) will amend the specification to expressly recite the essential material that is incorporated by reference as allowed by the applicable rules.

SUMMARY

The present invention provides among other things, a fastening device configured to install a protective barrier around a solar panel system, accounting for the varying geometrical shapes and configurations of existing solar panel systems, and without the need for time-consuming, cumbersome, and flawed procedures or materials that are likely to fail. The device is quick and easy to install and remove. Moreover, the device easily accommodates field conditions, may be installed under essentially any weather conditions, and is aesthetically pleasing. The device also accommodates the need to fasten protective barriers to each other in a quick and easy manner, and the fastening devices may be used countless times as opposed to the single-use devices that currently exist An aspect of the disclosure pertains to a system and method for fastening protective barriers to solar panel systems. The fastener system comprises a main clip that may be coupled to a support clip and a wireform splice. The main clip and support clip of the fastener system are adapted to engage with a solar panel frame regardless of the depth of the panel frame. Once engaged with the panel frame, a barrier, such as wire mesh, may be placed adjacent to a front face of the main clip and the wireform splice may be coupled to the main clip and engaged with the barrier. The splice is used to secure the barrier to the faceplate. Generally, multiple fastening devices are used to fully enclose a solar panel array with a barrier. In one embodiment, the fastening devices may be placed approximately two to three feet apart, and the barrier is coupled to each fastening device along the continuous run. In this way, a single section of barrier may be secured to the solar panel array system.

In another embodiment, several sections of barrier may be needed to secure one side of the solar array system. For example, a rectangular solar panel system that is approximately sixty feet by twenty feet may require several sections of barrier to secure the length and width of the system. In addition to using multiple fastening devices to secure the barrier, as described above, a wireform splice may be provided such that it is further adapted, in one embodiment, to be used as a splicing device to couple a plurality of barrier sections to one another. As described above and in further detail below, the present disclosure provides a novel and non-obvious system and method for efficiently preventing animal intruders from accessing critical components of solar array systems. The present disclosure provides a tool-less cost-effective device that is easy, intuitive, and quick to install in nearly any condition. While some embodiments have been described above and other embodiments are described in more detail below, a person skilled in the art will understand that the system and method described herein is not necessarily limited to the embodiments thus disclosed. The specific components of the system and method are described in further detail below.

The main clip comprises a front face comprising a top and sides, a plurality of support wings that are approximately perpendicular to the front face and extend from the sides of the front face, a plurality of vertical stoppers, a plurality of apertures adapted to engage with a wireform splice, and a flange that is approximately perpendicular to the front face and comprising a plurality of slots and adapted to receive a movable support clip. The front face is adapted to support at least a portion of a support barrier, such as wire mesh, wherein, the support barrier rests adjacent to the front face and is approximately parallel to the front face. In one embodiment of the present disclosure, the front face may comprise a plurality of apertures adapted to receive a plurality of hooks and/or bends of the wireform splice. In another embodiment, the front face may comprise at least three apertures adapted to receive at least three hooks and/or bends of the wireform splice. In another embodiment, the front face may comprise at least four apertures, a first aperture adapted to receive a first hook and/or bend of the wireform splice, a second aperture adapted to receive a second hook and/or bend of the wireform splice, a third aperture adapted to receive a third hook and/or bend of the wireform splice, and a fourth aperture adapted to receive a top hook and/or bend of the wireform splice. In another embodiment of the present disclosure, the front face may comprise a single aperture adapted to receive at least one hook and/or bend of the wireform splice. In another embodiment, the main clip may comprise a plurality of apertures adapted to receive a plurality of hooks and/or bends of the wireform splice. In this way, the apertures may be located on the front face of the main clip, or alternatively on the flange, support wings, and/or vertical stoppers, or a combination of all of some of these locations. In another embodiment, the support clip may comprise a plurality of apertures adapted to receive a plurality of hooks and/or bends of the wireform splice. In another embodiment, the main clip and the support clip may each comprise at least one aperture adapted to receive a hook and/or bend of the wireform splice. There are numerous other combinations that would allow the wireform splice to be coupled to the main clip and/or the support clip and use of any of these other combinations is within the scope of the claimed disclosure.

In one embodiment, the plurality of apertures may be sized to accommodate a wireform splice that is approximately ¼" in diameter, ½" in diameter, ¾" in diameter, 1" in diameter, or numerous other diameters that are sufficiently small to keep birds and rodents out and sufficiently large to provide a wireform splice of adequate strength. In another embodiment, the apertures may comprise circles, rectangles, slots, or numerous other shapes sufficient to engage with the wireform splice.

The vertical stoppers of the main clip may be adapted to form a recess, thereby setting the barrier underneath the panel frame rather than even with the frame. This provides a setback that may protect the barrier from damage caused by weather conditions such as rain, snow, and/or ice formation. This recess may be formed with a plurality of horizontal plates, which may form part of the main clip and extend from the top of the front face, approximately perpendicular to the front face, and in approximately the opposite direction of the flange. Additionally, the vertical stoppers may extend vertically from the horizontal plates, approximately perpendicular to the front face, and above the top of the front face. The stoppers comprise a support surface which engage with an outer portion of a solar panel support system. In this way, the stoppers support a counter-force to prevent the clip from being pushed off the panel frame from a force applied to the mesh or clip, which may occur during install, from weather or animals attempting to enter the gap, or various other natural and/or external forces.

The flange of the main clip is adapted to engage with the support clip. The flange extends from the top of the front face and is approximately perpendicular to the front face. The flange may comprise slots configured to engage with the support clip and to allow the support clip to be secured along various distances from the front face. In one embodiment, the flange is adapted to be inserted into the support clip. The lateral slots provide a resting place for the support clip when fastened to a panel. These slots allow for easy assembly to final position but when under load, the grooves catch a tab of the support clip, as more fully described below, thereby preventing unintended release of the support clip. If desired, however, a user may "unload" the tab by applying force to the loaded bottom tab of the support clip, using, for example, a flathead screwdriver or something similar. In one embodiment, the flange may comprise a first slot located farthest away from the front face and apart from a remainder of the plurality of slots. The intention of the first, isolated slot is to pre-assemble the fastener to help the installer press onto the panel. In one embodiment, a first lateral slot may be placed near the end of the flange and apart from the remaining plurality of lateral slots. The remaining plurality of lateral slots may be spaced equally from each other to accommodate any depth of the panel support system. In one embodiment there may be vertical sidewalls that are approximately perpendicular to the rear flange and extend approximately the distance of the plurality of lateral slots (e.g., extend from near the front face of the main clip to approximately half-way down the length of the rear flange). The side walls provide a gap to allow the support clip tab to pass through the plurality of lateral slots of the rear flange when engaged with the panel. In another embodiment, there may be slight bends to provide additional rigidity and space for coupling the main clip and the support clip while also maintaining a flush connection between the device and the bottom of the solar panel.

In one embodiment, the end of the flange may have a guide that angles approximately upward. In another embodiment the end of the flange may have a guide that angles approximately downward. The purpose of the guide is to meet the insertion point of the support clip and easily slide the flange into the lateral slot at the rear of the support clip.

The support clip comprises a top portion, a bottom portion, and a front and back. The support clip is coupled to the main clip by sliding it onto the flange of the main clip such that the top portion of the support clip is above and adjacent to the flange of the main clip the bottom portion is below and adjacent to the flange of the main clip. When the support clip is coupled to the main clip, the front of the support clip is closer to the front face of the main clip than the back of the support clip. The top portion of the support clip angles downward toward the front of the support clip. Approximately at the front of the support clip, the top portion reaches the bottom portion and presses against it. In this way, the top portion and the bottom portion form a clip comprising a space to accommodate a portion of a solar panel frame and the flange of the main clip. That is, the clip formed by the top and bottom portions may receive a portion of a solar panel frame to engage the fastening device to the panel system. Once the fastening device is engaged or coupled to the panel frame system, the barrier or mesh may be coupled to the fastening device.

The end of the top portion, near the front of the support clip, comprises a front panel guide. This guide is a tab that angles up and out from the top face. Its purpose is to help funnel and guide the clip onto the solar panel frame. Near the back of the support clip, the top portion curves down, creating a rear bend. The rear bend comprises a lateral slot approximately in the center of the bend. In other embodiments, the lateral slot could be towards the top or bottom of the rear bend. The lateral slot acts as an exit point for the rear flange of the main clip. The rear bend curves downward, forming the bottom portion of the support clip. The bottom portion is approximately straight relative to the top portion. The support clip further comprises an aperture, or bottom tab. The bottom tab is configured to engage with the flange of the main clip, a plurality of tabs, and/or a plurality of side walls.

The bottom portion of the support clip protrudes out meeting up with the top portion. In one embodiment, the bottom portion comprises a plurality of side walls that are approximately perpendicular to the bottom portion and extend away from the top portion (i.e., downward). When engaged with the main clip, the side walls sit on the outside of the support wing of the main clip. The purpose of the side walls is to support the main clip from moving horizontally when engaged. That is, the side walls form a channel intended to couple the support clip and the main clip and to prevent the main clip from disengaging from the support clip. In another embodiment, the bottom portion comprises a plurality of side walls that are approximately perpendicular to the bottom portion and extend toward the top portion (i.e., upwards). In this embodiment, when engaged with the main clip, the side walls sit on the outside of the rear flange of the main clip and extend from near the front face of the main clip to approximately half-way down the length of the rear flange. The purpose of the side walls is to support the main clip from moving horizontally when engaged. That is, the side walls form a channel intended to couple the support clip and the main clip and to prevent the main clip from disengaging from the support clip.

The support clip is adapted to engage a portion of a solar panel frame, wherein, at or near the front of the support clip, the top and bottom portions press against each other creating a clamping force that engages the solar panel frame. The side walls prevent the main clip from exiting the intended channel. The support clip may further comprise an aperture at or near the back to allow the flange of the main clip to pass through to accommodate whatever depth of the solar panel frame is encountered. As the rear flange of the main clip passes through the aperture, the bottom "tab" will rest in a corresponding slot of the main clip's flange. The bottom tab is adapted to move with ease in one direction, but not the opposite once it engages with a slot.

The wireform splice is a continuous rigid or semi-rigid rod comprising a top and a bottom. The top and bottom comprises a finger tab (or plurality of finger tabs), a plurality of bends, and a plurality of lengths between the bends. A middle piece extends between the top and bottom and presses the mesh barrier firmly against the main clip face when engaged. A hook is a bend in the wireform intended to capture the main clip or wire mesh. A finger tab is a bend in the wire mesh intended for the installer to hold in order to maneuver wireform splice to the final engaged position. The bottom of the wireform splice comprises a plurality of bends and hooks to engage with a plurality of apertures on the main clip. In other embodiments the bottom of the wireform splice may comprise of a hook or finger tab. When engaged the middle piece extends towards the top of the wireform splice. The top of the wireform splice comprises a hook and finger tab. In other embodiments the top of the wireform splice may comprise of a plurality of hooks or a plurality of finger tabs. The wireform splice is specially configured to be dual purpose and allows for a "tool-less" installation.

First, the wireform splice is configured to couple a barrier to the main clip. This may be achieved by passing two lower prongs (e.g., hooks or finger tabs made from bent wire) through openings in a section of the wire mesh barrier and continuing through the bottom apertures of the main clip. The wireform can rotate towards top of main clip while bottom is engaged and capturing the barrier. The top hook of the wireform splice can pass through an opening in a section of the wire mesh barrier and continue through to the top aperture of the main clip, hooking back through the other top aperture of the main clip to stay in place.

Second, the wireform splice is configured to couple, join or splice a plurality of sections of barrier together. This may be achieved by passing two lower prongs through openings in a first section of barrier and continuing through a second section of barrier. Next, the top portion of the wireform splice passes through the first section of barrier and continues through the second section of barrier. Once secured with necessary force, the wireform will hold the two barriers firmly together.

A series of steps need to be accomplished to install the system those steps are carried out as follows; First, couple the support clip to the main clip by sliding the support clip (horizontally, with small triangle side up, this is the top portion of the support clip) onto the flange of the main with the plurality of lateral slots.

Second, couple the pre-assembled piece (i.e., the main clip coupled to the support clip) to a portion of the panel frame by sliding the support clip onto the frame such that the portion of the panel frame is secured between the top and bottom portions of the support clip. Sliding of the device may be achieved by pressing a backside of the front face of the main clip. The device should be pressed/slid onto the panel frame until the vertical stoppers are approximately flush with the exterior face of the solar panel frame. In pushing the main clip, the bottom tab of the support clip will eventually engage with an appropriate lateral slot depending on the depth of the unique solar panel frame. Once engaged with the lateral slot, the fastening device is sufficiently secured to allow for installation of the barrier system. Because the vertical stoppers determine the final resting position of the fastening device, this thereby ensures a slight recess is provided for the mesh. That is, the wire mesh is set back slightly from the face of the solar panel frame.

Third, the barrier system or wire mesh is placed around the perimeter of the solar panel frame. A person skilled in the art will understand the various steps associated with installing wire mesh. For instance, the installer must measure the distance from the bottom of the panel frame system to the roof. The installer may cut the mesh (for example, from 100-foot rolls) into ten to twelve-foot sections with tin snips or sheer cutters. This allows for easier transport to the roof and easier handling for install. Alternatively, the wire mesh may be installed in longer, uncut lengths, though this is much more difficult. The installer may bend the lengths of wire mesh to the appropriate height to fill the gap between roof and panel. Typically this is done to form a "C" or an "L" shape to add rigidity to the mesh. The installer may prebend such that the mesh is pressed firmly against the roof to the underside of the panel for final installed position.

Fourth, the barrier system or wire mesh is coupled or secured to the preassembled fastening devices that are already installed around the perimeter of the panel frame. Alternatively, the fastening devices may be installed to the panel frame after the barrier system or wire mesh is cut, measured and pre-bent. As previously described, to couple the fastening devices to the panel frame, the installer may reach under the panel and slide the support clip onto the frame. Then, the installer can press the main clip forward, while supporting the support clip with his or her index finger, until the upper tabs rest flush with the font edge of the panel. The clips should be installed such that the end of each length of material is supported, approximately 2-5 inches from the end of a single mesh piece. The installer may include fastening devices approximately every two to six-feet to adequately support the barrier system or mesh. The distance between the fastening devices may be inversely proportional to the gap between the frame and the roof. For example, a smaller gap of one to two inches may allow for greater spacing of the fastening devices because there is less material to support.

A person skilled in the art will understand that when installing the system, it may be helpful to use diagonal cutters to customize each piece of mesh according to varying geometries, configurations, and other obstacles, such as A/C units, chimneys, or any other number of items encountered on a roof. In addition, it may be necessary to use cutters to accommodate corners of the array edge. Other obstacles may include solar racking components, roof venting, conduit, and/or wire bundles.

Fifth, as the mesh is placed to cover the gap, the wireform splice is utilized to couple the mesh to the main clip, which is affixed to the panel frame.

Sixth, once an entire length of mesh is secured, a second run may be installed by utilizing two wireform splices to couple the two pieces of mesh together.

After the splice is secure, the installer will again first install the clips around the perimeter of the solar array prior to fitting the mesh. Then, each piece will be secured to the clips until the entire perimeter is complete.

In the case that an installer needs to remove the wire mesh parameter, installer detaches wire splice from fastener and removes wire mesh. Next, installer may "unload" the bottom tab of the support clip using a flathead screwdriver or something similar. The screwdriver may be inserted through one of the front entrance holes of the main clip in order to apply force to the loaded bottom tab of the support clip. Installer will then be able to separate the support clip from the main clip and remove the support clip from the panel frame.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 6 depicts an alternative embodiment of the support clip from a top side view.

FIG. 7 depicts an alternative embodiment of the support clip from a back view.

FIG. 8 depicts an alternative embodiment of the support clip from a side view.

FIG. 16 depicts the splice marrying two pieces of wire mesh together.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
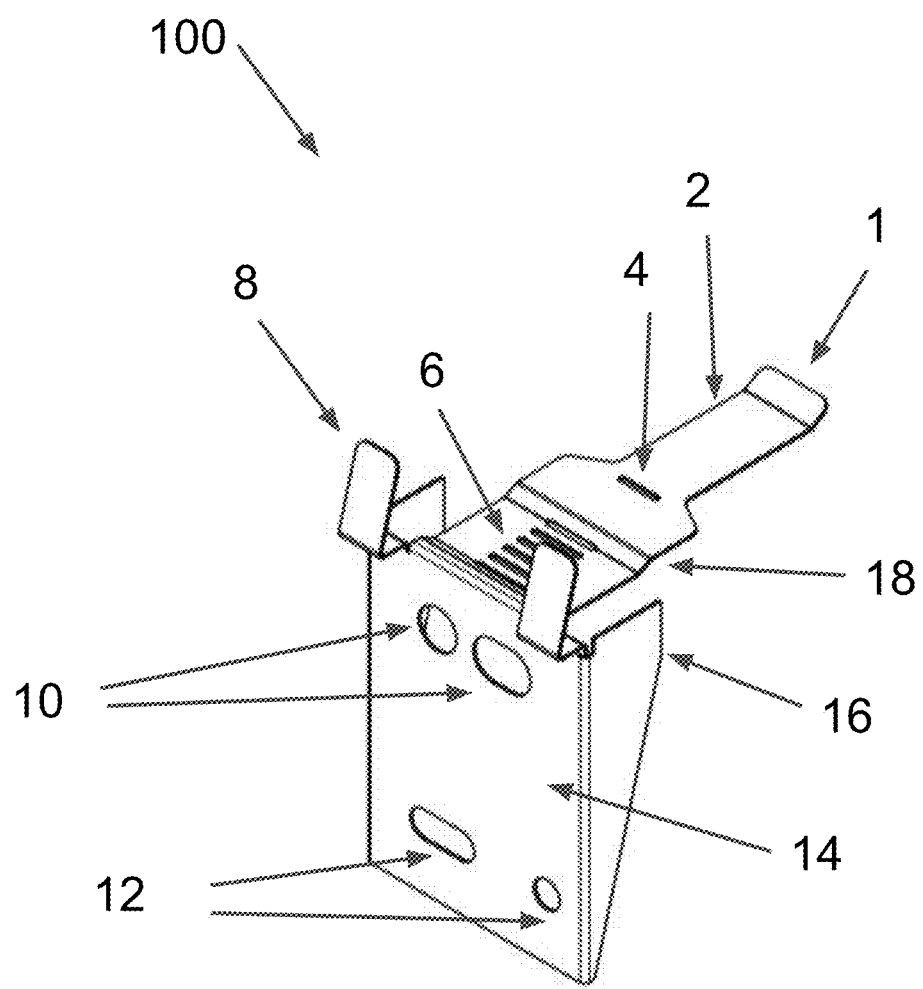
FIG. 1 depicts an embodiment of the main clip.

In one application, FIG. 1 depicts an embodiment of the main clip 100. In this embodiment, the main clip 100 comprises a front face 14, a plurality of support wings 16 that are approximately perpendicular to the front face 14 and extend from the sides of the front face 14, a plurality of vertical stoppers 8, a plurality of apertures 10,12 adapted to engage with a wireform splice 300, and a flange 2 that is approximately perpendicular to the front face 14. In this embodiment, the flange 2 may comprise a plurality of bends 18 to provide rigidity and space for coupling the main clip 100 and the support clip 200 while also maintaining a flush connection between the device and the bottom of the solar panel. The flange 2 may also comprise a plurality of slots 6 and are adapted to receive a movable support clip 200 and a single vertical slot or plurality of vertical slots 6 approximately towards the end of the flange 4 and a guide approximately at the end of the flange 1 to help couple the support clip 200 and the main clip 100. Within this embodiment the term support wings can be further defined in alternative embodiments as any form of support structure providing support to a main fastener having a front plate attached to a solar or roof panel frame.

Figure 2:
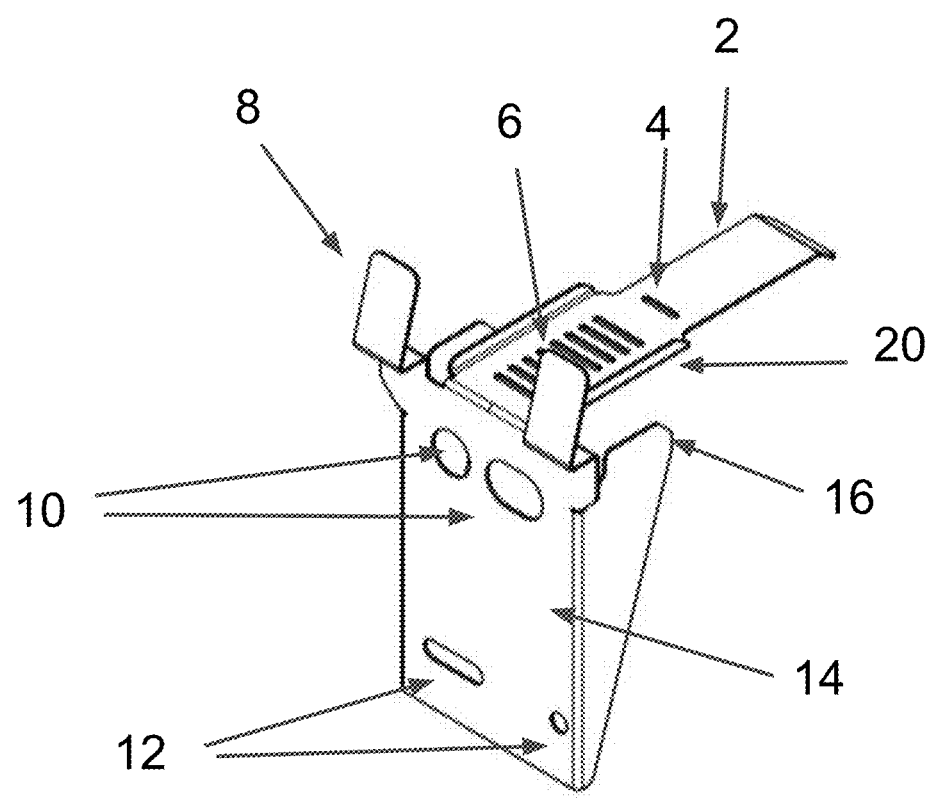
FIG. 2 depicts an alternative embodiment of the main clip.

FIG. 2 depicts an embodiment similar to FIG. 1 described above, however FIG. 2 comprises a plurality of side walls 20 approximately perpendicular to the flange 2 and extending approximately the distance of the plurality of lateral slots 6. The plurality of lateral slots 6 being able to receive a portion of the main clip within the slot.

Figure 3:
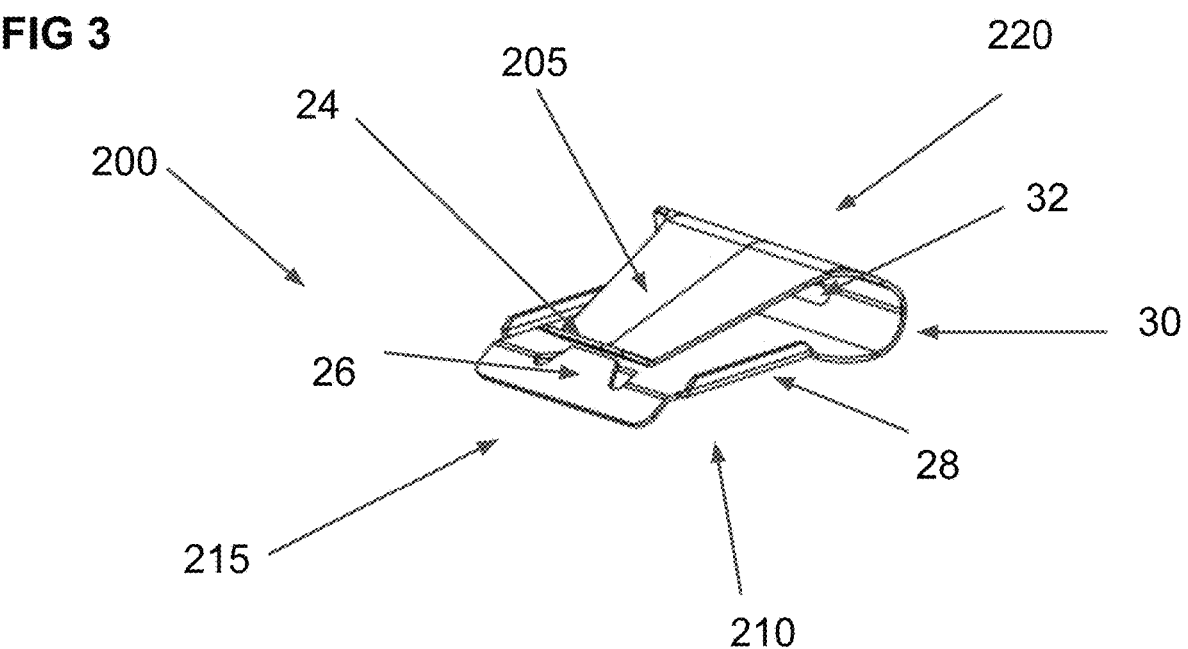
FIG. 3 depicts an embodiment of the support clip from a top side view.

FIG. 3 depicts an embodiment of the support clip 200. In this embodiment, the support clip 200 comprises a first or top portion 205, a second or bottom portion 210, and a first end or front 215 and a second end or back 220. The top portion of the support clip 205 angles downward toward the front 215 of the support clip. The top portion may be flexibly bent relative to the bottom portion. Approximately at the front of the support clip 215, the top portion reaches the bottom portion 210 and presses against it. In this way, the top portion 205 and the bottom portion 210 form a clip comprising a space to accommodate a portion of a solar panel frame and the flange 2 of the main clip. The end of the top portion 205, near the front 215 of the support clip, comprises a front panel guide 24. Its purpose is to help funnel and guide the clip onto the solar panel frame. Towards the back 220, the support clip comprises a rear bend 30 comprising a lateral slot 32 or plurality of lateral slots approximately near the center, top or bottom of the rear bend 30. The lateral slot 32 provides an exit point for the flange 2 of the main clip 100. The front of the bottom portion 210, comprises a bottom tab 26 configured to engage with the flange 2 of the main clip, a plurality of tabs, and/or a plurality of side walls. As the rear flange 2 of the main clip passes through the space between the front panel guide 24 and the bottom tab 26, the bottom tab 26 will rest in a corresponding vertical slot 6 of the flange 2 of the main clip. The bottom tab 26 is adapted to move with ease in one direction, but not the opposite once it engages with a vertical slot 6.

In this embodiment the bottom portion 210, comprises a plurality of side walls 28 that are approximately perpendicular to the bottom portion 210 and extend toward the top portion 205. When engaged with the main clip 100, the side walls 28 sit on the outside of the flange 2 of the main clip. The side walls 28 form a channel intended to support the main clip 100 from moving horizontally and disengaging from the support clip 200.

Each of the main clip 100 and the support clip 200 may be formed as unitary and integral parts. The main clip 100 and the support clip 200 may be formed as separate and separable parts. The parts may be formed of any suitable material. A metal or plastic material that is able to withstand various weather conditions may be suitable. Any suitable manufacturing process may be used to form the parts, such as conventional manufacturing methods including molding or casting, additive manufacturing, or a combination thereof.

Figure 4:
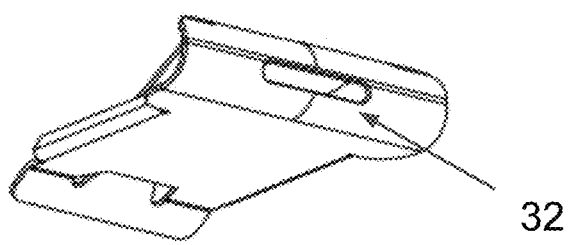
FIG. 4 depicts an embodiment of the support clip from a back view.

FIG. 4 depicts the same embodiment as described in FIG. 3, however from a rear, bottom view. FIG. 4 shows the lateral slot 32 at the back portion 220 approximately near the rear bend 30.

Figure 5:
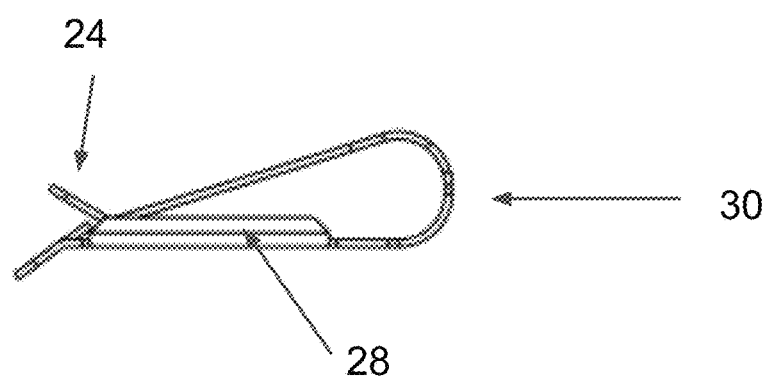
FIG. 5 depicts an embodiment of the support clip from a side view.

FIG. 5 depicts the same embodiment as described in FIG. 3 and FIG. 5, but from a side view.

FIG. 6 depicts an alternative embodiment of the support clip 200. In this embodiment the bottom portion 210, comprises a plurality of side walls 28 that are approximately perpendicular to the bottom portion 210 and extend away from the top portion 205. When engaged with the main clip 100, the side walls 28 sit on the outside of the support wing 16 of the main clip 100. The side walls 28 form a channel intended to support the main clip 100 from moving horizontally and disengaging from the support clip 200.

FIG. 7 depicts the same embodiment as described in FIG. 6, however from a rear, bottom view. FIG. 7 shows the lateral slot 32 at the back portion 220 approximately near the rear bend 30.

FIG. 8 depicts the same embodiment as described in FIG. 6 and FIG. 7, but from a side view.

Figure 9:
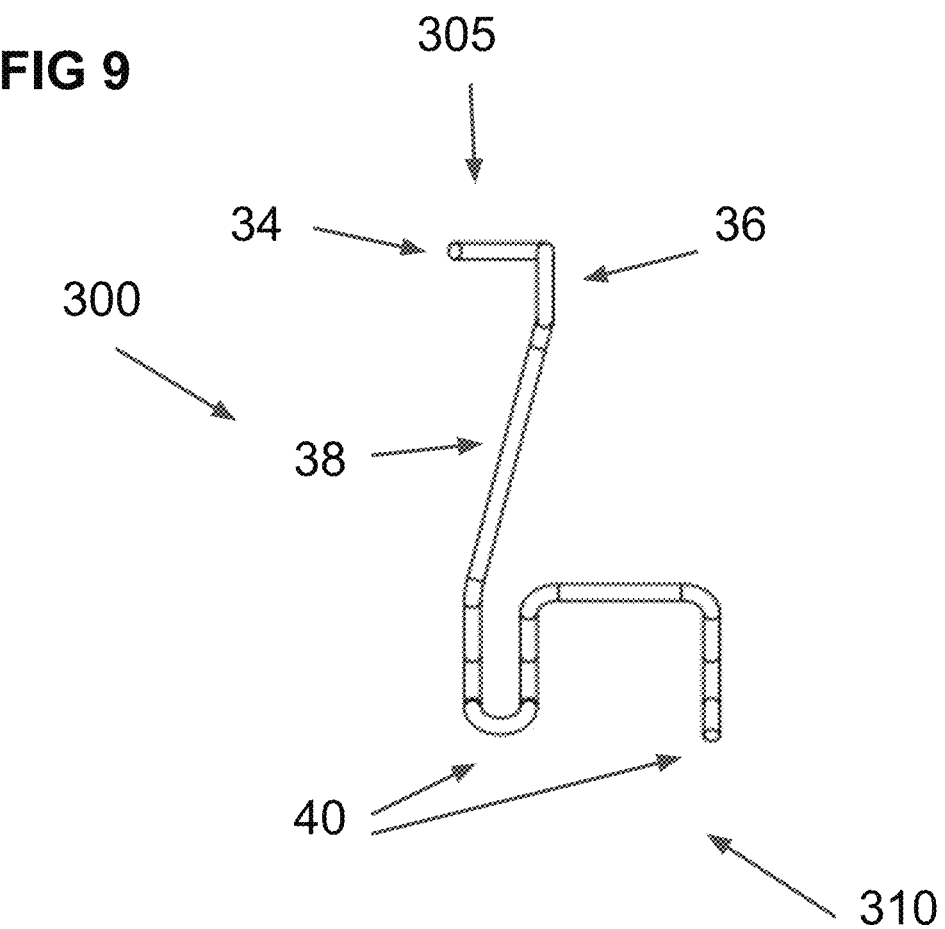
FIG. 9 depicts an embodiment of the wireform splice from a front view.

FIG. 9 depicts an embodiment of the wireform splice 300. in this embodiment the splice 300 comprises a top 305 and bottom 310. The top 305 comprises a plurality of bends and a plurality of lengths between bends comprising a hook 34 and a finger tab 36. A middle piece 38 extends between the top 305 and bottom 310 and presses the mesh barrier firmly against main clip face 14 when engaged. The bottom 310 comprises a plurality of bends and hooks 40 to engage with a plurality of apertures 10,12 on the front face 14 of the main clip. This wireform may be made out of any suitable material be it metal, plastic or other composition of matter.

Figure 10:
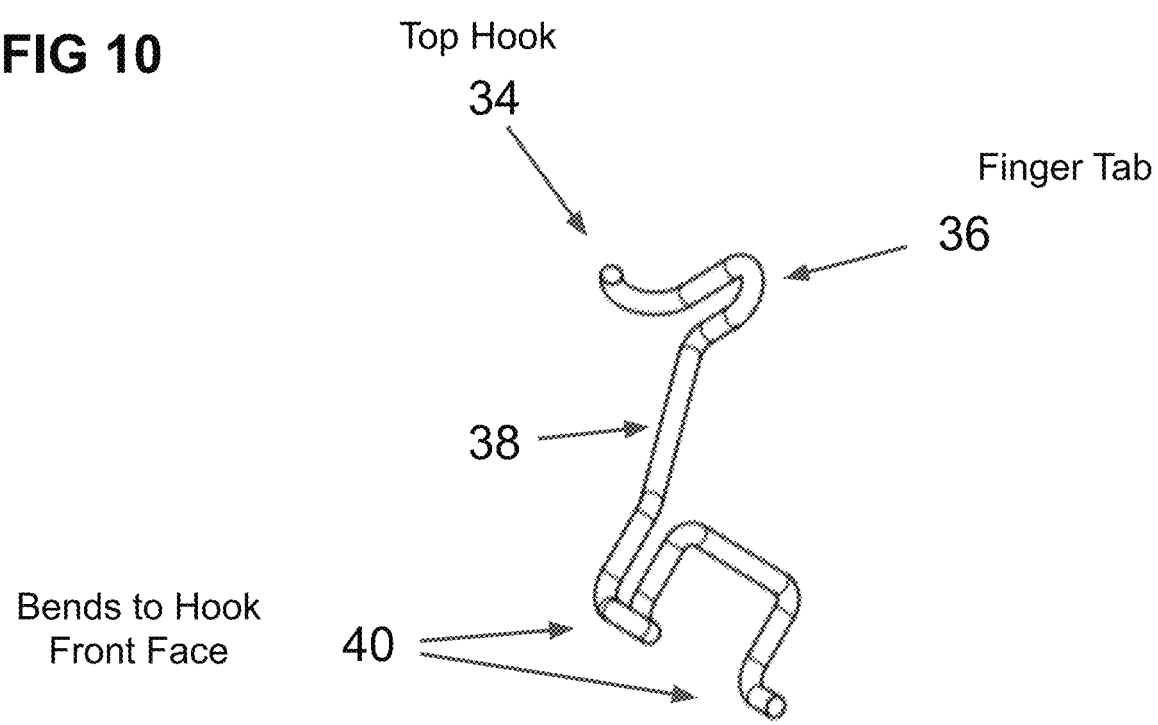
FIG. 10 depicts an embodiment of the wireform splice from a side view in order to see the bends, hooks and finger tabs.

FIG. 10 depicts the same embodiment as described in FIG. 9, but from an angled view. This view allows for observation of specific bends located on this embodiment those bends including the top hook 34, bends to hooks front face 40, and a finger tab 36. These hooks may be configured in a plurality of different ways so long as they accomplish their defined purpose.

Figure 11:
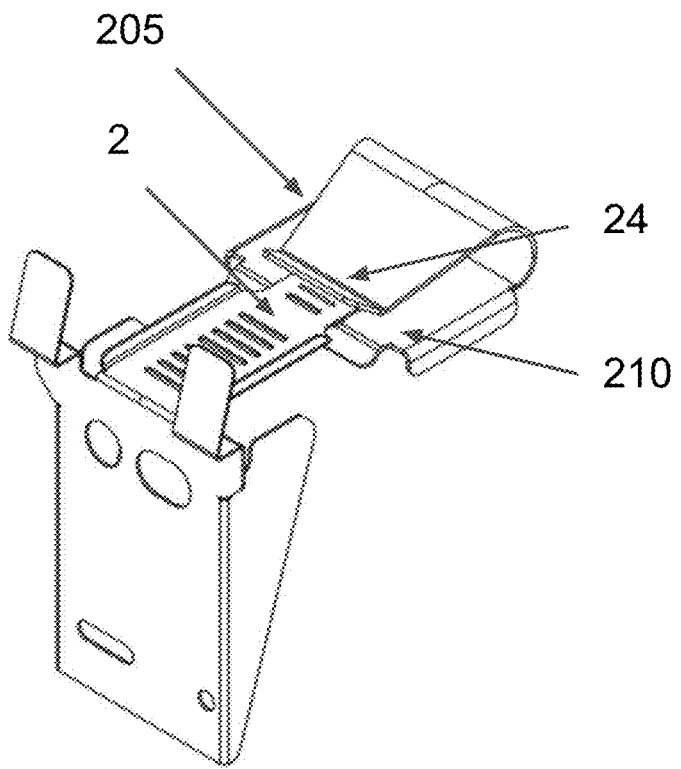
FIG. 11 depicts an embodiment of the support clip preloaded onto the rear flange of the main clip.

FIG. 11 depicts the rear flange 2 of the main clip 100 sliding between the top portion 205 and bottom portion 210 of the support clip 200 and being guided by the front panel guide 24 of the support clip 200.

Figure 12:
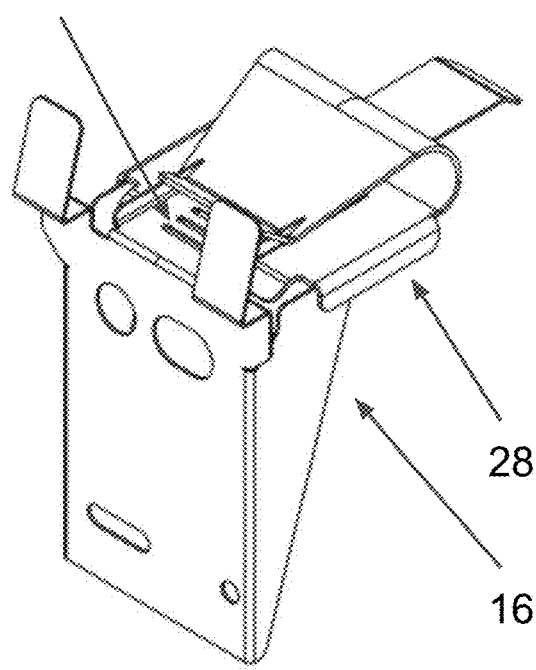
FIG. 12 depicts an embodiment of the support clip inserted onto the rear flange of the main clip and fastened onto approximately one of the lateral slots of the main clip.

FIG. 12 depicts the support clip 200 latched onto the plurality of lateral slots 6. In this embodiment the bottom portion 210 of the support clip 200, comprises a plurality of side walls 28 that are approximately perpendicular to the bottom portion 210 and extend away from the top portion 205. The side walls 28 sit on the outside of the flange 2 and slide on the outside of the support wings 16 of the main clip 100. The side walls 28 form a channel intended to support the main clip 100 from moving horizontally and disengaging from the support clip 200.

In some embodiments the bottom portion 210 of the support clip 200, may comprise a plurality of side walls 28 that are approximately perpendicular to the bottom portion 210 and extend toward the top portion 205. When engaged with the main clip 100, the side walls 28 sit on the outside of the flange 2 of the main clip.

Figure 13:
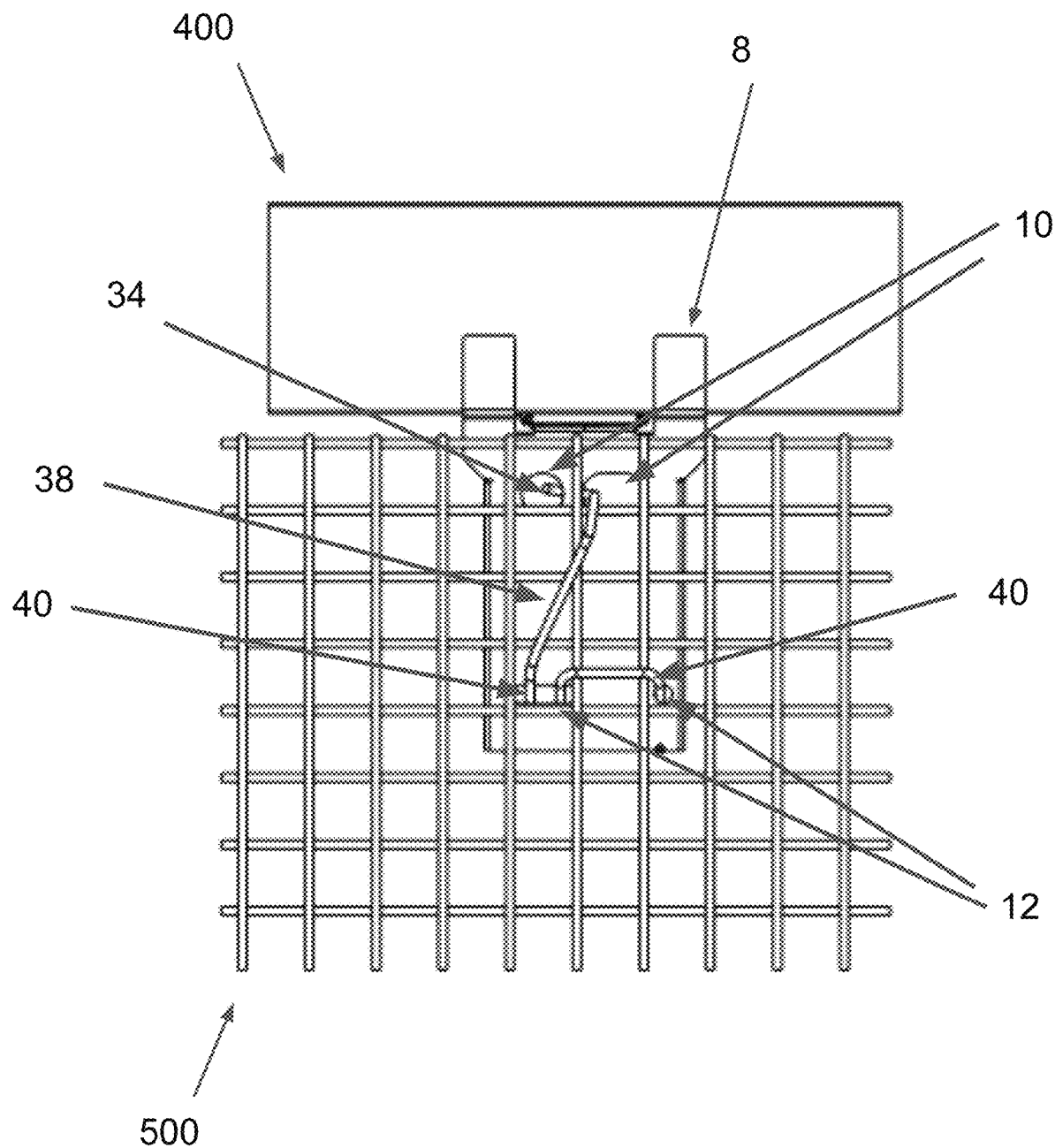
FIG. 13 depicts a view of the main clip and support clip attached to the module frame with wire mesh placed against the main face of the main clip.

FIG. 13 depicts an embodiment of the main clip 100 fastening the wire mesh 500 to the solar panel frame 400. In this embodiment the wire mesh 500 is pressed against the front face 14 of the main clip 100. The plurality of vertical stoppers 8 press on the front face of the solar panel frame 42. The wireform splice 300 is fastened to the front face 14 of the main clip 100 by a plurality of bottom bends 40 secured around the bottom apertures 12 on the front face 14 and the hook 34 is secured around the top apertures 10 on the front face 14. The middle piece 38 presses the wire mesh 500 to the front face 14 of the main clip 100.

Figure 14:
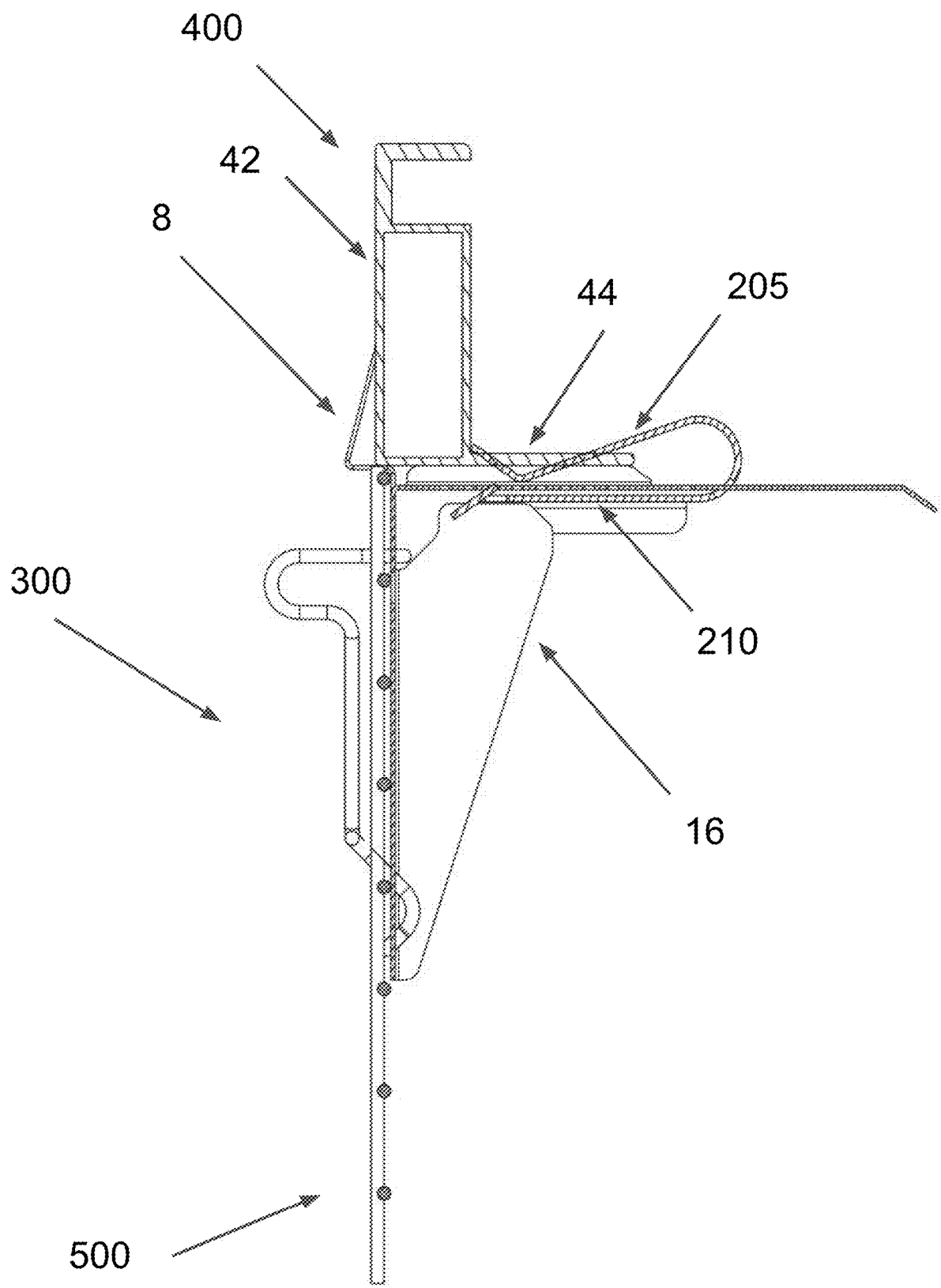
FIG. 14 depicts a side view of the entirety of the fastener attached to the module frame, holding the wire mesh in place.

FIG. 14 depicts a side view of an embodiment of the support clip 200 clamped onto the inside of solar panel frame 44 and the main clip 100 and the wire mesh 500 are attached to the front face 14 by the wireform splice 300. In this embodiment the front face 14 of the main clip 100 sits approximately flush but indented to the front face of the solar panel frame 42 and the flange 2 sits approximately perpendicular to the front face of the solar panel frame 42 and approximately parallel to the inside of the panel frame 44. The plurality of vertical stoppers 8 press against the front face of the solar panel frame 42. The support wing 16 rests approximately parallel with the inside of the solar panel frame 44. This embodiment of the support clip 200 comprises the top portion 205 and the bottom portion 210 fastened onto the flange 2 and the inside of the panel frame 44. This embodiment of the wireform splice 300 affixes the wire mesh 500 to the front face 14 of the main clip 100. The bottom bends 34 insert through the opening in the wire mesh 500 and continue through the bottom apertures 12 of the main clip 100. The top hook 34 is inserted into the opening in the wire mesh 500 and continued through the top apertures 10 of the main clip 100. The finger tab 36 protrudes approximately perpendicular to the front face 14 of the main clip 100.

Figure 15:
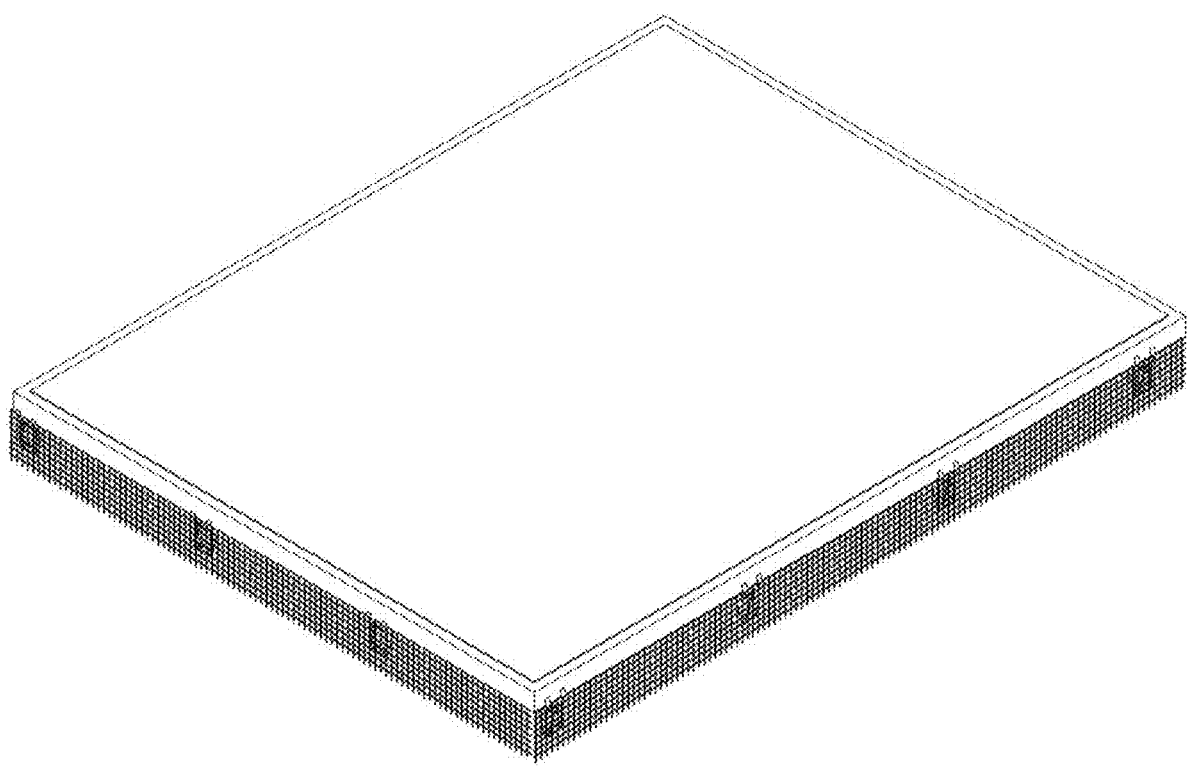
FIG. 15 depicts a view of the fastener placed around the parameter of a solar panel frame, holding the wire mesh in place to fill the gap between the frame and the roof.

FIG. 15 depicts a plurality of fasteners attached to the solar panel frame 400 and holding the wire mesh 500 in place to secure the space between the panel frame 400 and roof.

FIG. 16 depicts an embodiment of the wireform splice 300 securing two pieces of wire mesh 500 together. In alternative embodiments the mesh may be made of varying materials such as plastics or other viable materials. In this embodiment, the bottom bends 34 insert through the opening in the first layer of wire mesh 500 and continues through to the second layer of wire mesh 500. The top hook is inserted into the opening in the first layer of wire mesh 500 and continues through to the second layer of wire mesh 500. In this way the plurality of hooks and bends in the wireform splice 300 grab onto the wire mesh and hold it in place so they do not separate. The middle piece 38 extends between the top 305 and bottom 310 and presses against the first layer of wire mesh 500. Alternative embodiments may include the mesh being made of any material and is not limited to only wire mesh material, plastic, or polyurethane mesh types may also be used by the present embodiment.

Figure 17:
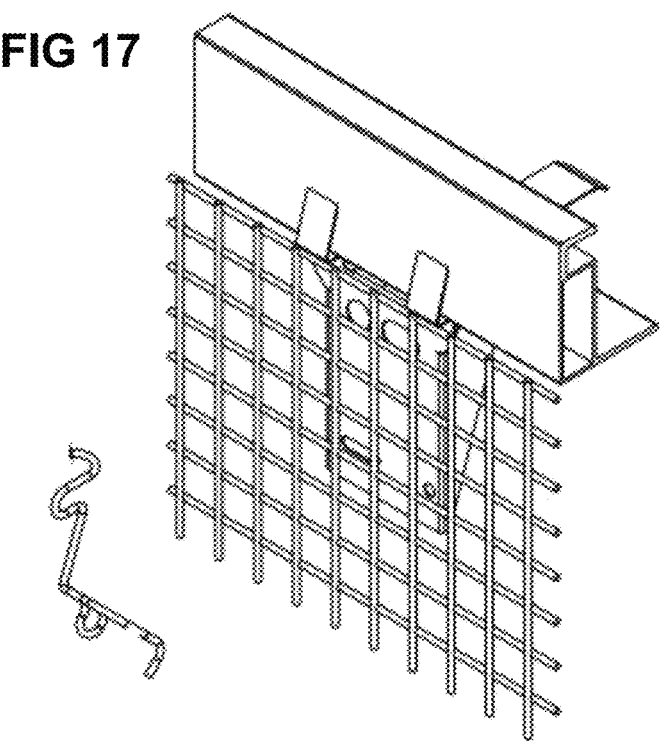
FIGS. 17 and 18 depict the entirety of the fastener attached to the module frame, holding the wire mesh in place.
Figure 18:
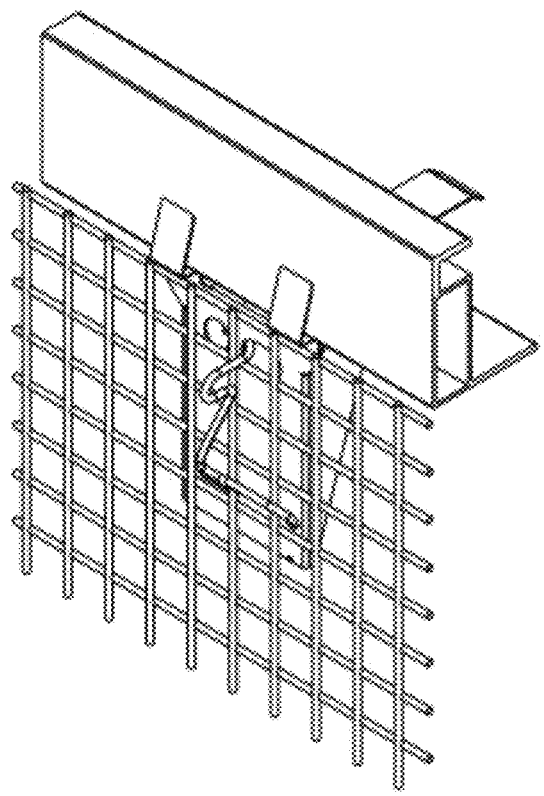

FIGS. 17 and 18 depict the entirety of the fastener attached to the module frame, holding the wire mesh in place.

I claim:

1. A fastener for fastening a wire mesh protective barrier to a solar panel frame, the fastener comprising:
   a main clip comprising:
   a vertical front face which is substantially planar and includes a plurality of apertures; and
   a flange extending rearward from the front face, the flange comprising at least one slot;
   a resilient support clip movably attached to the main clip, the support clip comprising:
   a pair of opposing upper and lower walls extending from a U-shaped flexibly bent base, the upper wall being angled toward the lower wall to define a channel therebetween with an opening facing the main clip;
   a lateral slot formed in the U-shaped base, wherein the flange of the main clip extends through the channel and through the lateral slot such that the flange extends rearward from the U-shaped base and such that the support clip is slidable along an elongated length of the flange toward the front face of the main clip; and
   a tab extending from the lower wall within the channel, the tab being received in a corresponding one of the at least one slots in the flange of the main clip to couple the support clip to the main clip, wherein the tab is only movable in one direction when engaged with the corresponding slot;
   wherein the channel of the support clip is configured to receive a portion of the solar panel frame to attach the main clip to the solar panel frame; and
   wherein at least one of the plurality of apertures in the front face of the main clip are configured to engage a fastener for coupling the wire mesh protective barrier to the front face of the main clip.

2. The fastener of claim 1, wherein the flange comprises a plurality of bends; and
   wherein the plurality of bends extend in a perpendicular direction relative to the elongated length of the flange.

3. The fastener of claim 1, wherein the main clip further comprises a plurality of support wings that extend outward from sides of the front face.

4. The fastener of claim 2, wherein the flange of the main clip further comprises a plurality of slots configured to receive the tab of the support clip to couple the support clip to the main clip.

5. The fastener of claim 1, wherein the main clip further comprises a plurality of stoppers projecting from the main clip that are configured to engage the solar panel frame.

6. The fastener of claim 1, wherein the support clip further comprises a plurality of sidewalls extending from the lower wall that form the channel in which the main clip is received, wherein the plurality of sidewalls are configured to limit lateral movement of the main clip.

* * * * *